United States Patent [19]
Holecek et al.

[11] 4,315,289
[45] Feb. 9, 1982

[54] MAGNETIC DISK DRIVE MACHINE

[75] Inventors: Joseph J. Holecek, Kasson; Michael N. Zell, Rochester, both of Minn.

[73] Assignee: International Business Machines Corporation, Armonk, N.Y.

[21] Appl. No.: 82,447

[22] Filed: Oct. 9, 1979

[51] Int. Cl.³ .................... G11B 5/016; G11B 21/08; G11B 17/02; G11B 5/55
[52] U.S. Cl. .................................. 360/99; 360/106; 360/105; 360/130.34
[58] Field of Search ............ 360/99, 106, 105, 130.34, 360/78, 97

[56] References Cited

U.S. PATENT DOCUMENTS

| | | | |
|---|---|---|---|
| 4,001,888 | 1/1977 | Morgan | 360/99 |
| 4,024,581 | 5/1977 | Lesca et al. | 360/99 |
| 4,040,106 | 8/1977 | Medley | 360/99 |
| 4,052,750 | 10/1977 | Barber et al. | 360/99 |
| 4,193,102 | 3/1980 | Beuch et al. | 360/130.34 |
| 4,198,666 | 4/1980 | Manzke et al. | 360/106 |

FOREIGN PATENT DOCUMENTS 2257976  8/1975  France ............................ 360/78

OTHER PUBLICATIONS

Lissner et al., "Disk File Actuator", IBM Tech. Disc. Bull., vol. 17, No. 10, Mar. 1975, p. 3016.

Primary Examiner—Robert S. Tupper
Attorney, Agent, or Firm—Robert W. Lahtinen; Keith T. Bleuer

[57] ABSTRACT

A drive machine for magnetic diskettes of the type including a flexible disk rotatably disposed in a jacket having aligned radial slots in the two thicknesses of the jacket. The machine includes a pair of transducers extending through one of the slots into contact with one side of the disk and a pair of backup pads effective on the other side of the disk respectively opposite the pair of transducers and swingably mounted by swing arms to the frame of the machine. A motor driven cam plate with a spiral groove and a follower therein are used for moving the transducers radially on the disk for registry with different magnetic tracks thereon, and the cam plate has a peripheral portion that moves the swing arms to disengage the pads from the disk at outermost magnetic tracks for the transducers. The disk is clamped between a rotatable drive spindle and a collet, and the collet is carried on a swing arm mounted on the frame. Interconnections are provided between the swing arms so that, when the collet is moved out of engagement with the spindle, the pads are likewise moved out of engagement with the disk.

4 Claims, 9 Drawing Figures

MAGNETIC DISK DRIVE MACHINE

BACKGROUND OF THE INVENTION

The invention relates to magnetic disk drive machines and more particularly to such machines which utilize diskettes of the type disclosed in U.S. Pat. No. 3,668,658. Such a diskette includes a thin flexible magnetic disk which is rotatably disposed in a jacket of somewhat thicker and somewhat less flexible material.

Such a disk drive machine is disclosed in U.S. Pat. No. 3,678,481. The disk drive machine of this patent includes a magnetic transducer and a pressure pad opposite the transducer both of which are carried in a caliper or U-shaped carriage. An electric solenoid is used to move the pressure pad toward and away from the transducer to allow insertion of the diskette into the machine and to cause the pad to back up the disk and transducer. The U-shaped carriage and thus the transducer and pad are moved radially of the disk to access different magnetic concentric tracks by a motor driven screw.

SUMMARY OF THE INVENTION

It is an object of the present invention to provide an improved, low cost, relatively small disk drive machine which is particularly adapted for use with such diskettes. More particularly, it is an object of the invention to mount backup pads with respect to magnetic transducers in such a machine so that the pads are in effect fixed in the direction of movement of the transducers across the disk and so that a caliper or U-shaped type of transducer and backup pad carriage is not needed. It is a more particular object of the invention to provide in a machine of this type a pair of transducers mounted in a carriage driven by a cam plate with a spiral groove for receiving a follower carried by the carriage, the use of the pair of transducers allowing a relatively small diameter cam plate to be utilized while still rendering the full data susceptible area of the disk available.

In a preferred form, the disk drive machine of the invention comprises a machine frame formed by a main frame and a subframe fixed together, a pair of magnetic heads or transducers carried by a carriage that is in turn reciprocatively mounted on the subframe so that the transducers may traverse lengthwise one of the slots in the magnetic diskette used in the machine in contact with one face of the disk, a pair of backup pads for the transducers effective on the other side of the disk and swingably mounted by swing arms on the main frame in such manner that the pads have no longitudinal movement with respect to the carriage, a cam plate having a helical groove receiving a follower connected with the carriage for moving the carriage radially of the disk as the cam plate is rotated, a motor driving the cam plate so as to thereby radially move the carriage and heads with respect to the disk, a disk drive spindle and a collet for clamping the disk on the disk drive spindle, a motor for drivingly rotating the spindle, a swing arm for swingingly mounting the collet with respect to the main frame, a manually actuatable lever effective for swinging the collet arm and thereby swinging the collet out of engagement with the disk and spindle, interconnections between the swing arm for the collet and the swing arms for the pads so as to move the pads out of engagement with the disk when the collet is disengaged with respect to the spindle, and a ramp portion on the cam plate effective on a pin which is in turn effective on the swing arms for the pads for moving the pads out of engagement with the disk when the carriage is moved to a position corresponding to outermost tracks of the magnetic heads on the disk.

DESCRIPTION OF THE PREFERRED EMBODIMENT

Figure 3:
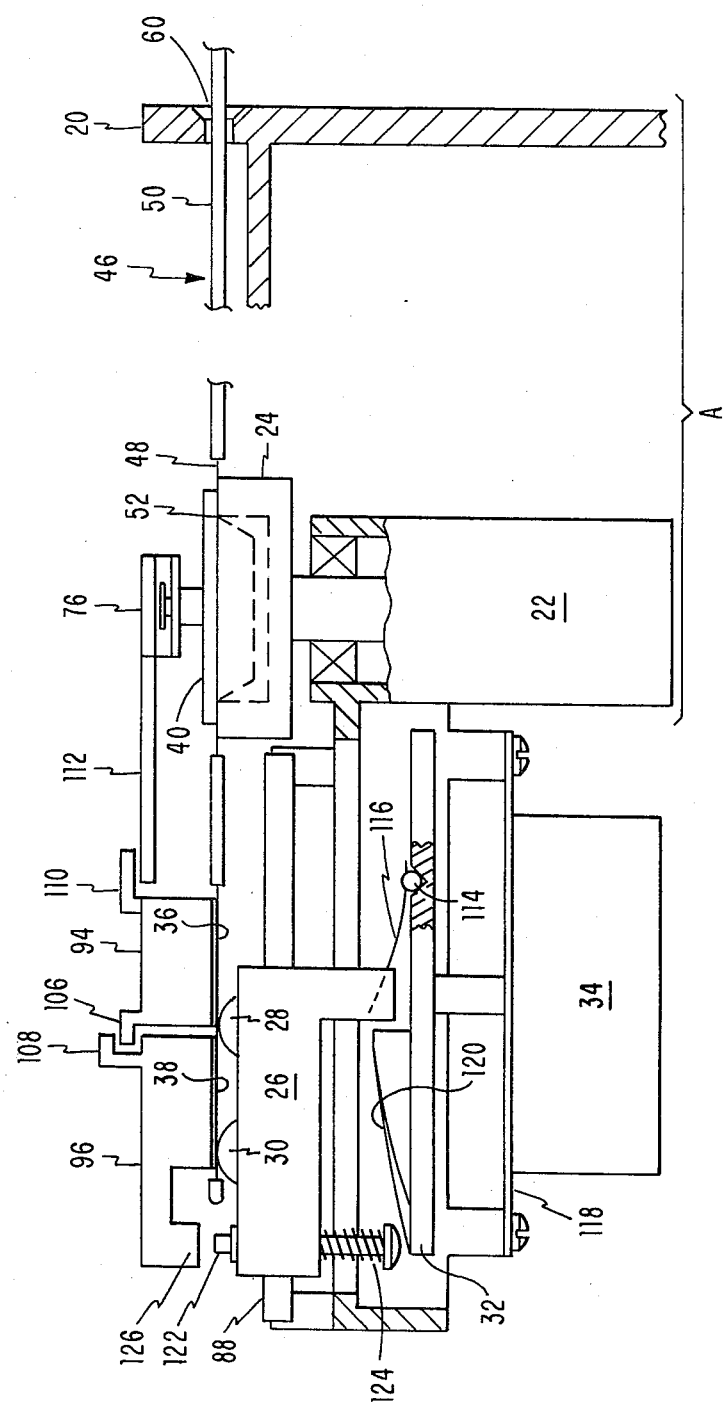
FIG. 3 is a sectional view taken on line 3—3 of FIG. 1.
Figure 4:
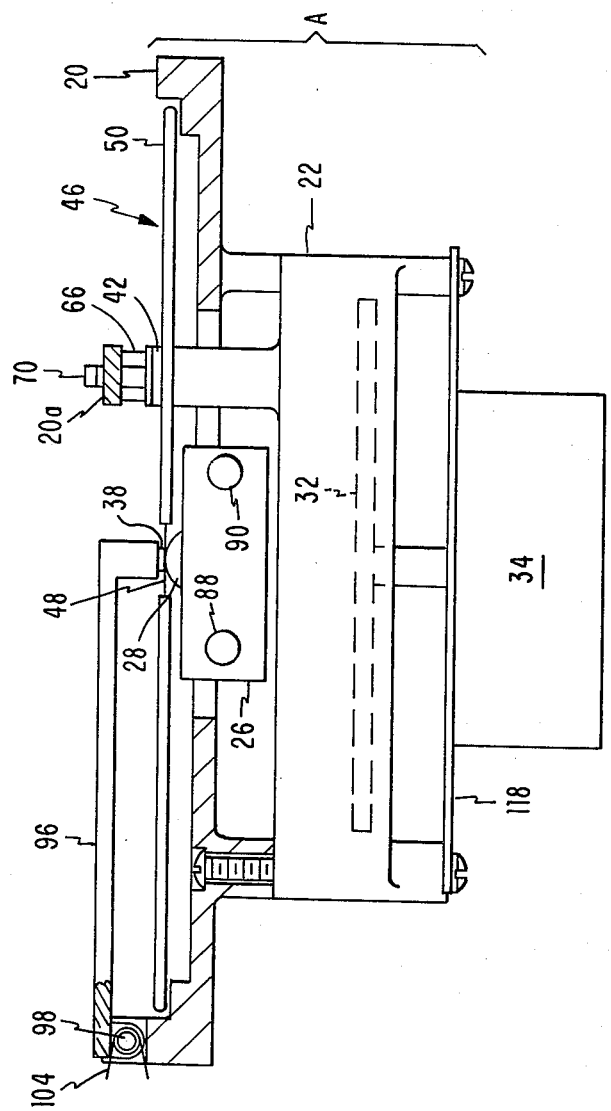
FIG. 4 is a sectional view taken on line 4—4 of FIG. 1.

The disk drive machine includes a main frame 20 and a subframe 22 which are fixed together to form a disk drive machine frame A (see FIGS. 3 and 4). The subframe 22 carries a disk drive spindle 24, a carriage 26 carrying a pair of magnetic heads or transducers 28 and 30, a cam plate or face cam 32 for drivingly moving the carriage 26, and a motor 34 for driving the cam plate 32. The main frame 20 carries a pair of elongate pads 36 and 38 that cooperate with the magnetic heads 28 and 30, a collet 40 that cooperates with the spindle 24, a pressure plate 42 (see FIG. 5) and a main drive motor 44 (see FIG. 1) for driving the spindle 24.

The disk drive machine is adapted to receive a diskette 46 which is of the same type as is described in Flores et al, U.S. Pat. No. 3,668,658. The diskette 46 includes a thin disk 48 of flexible material rotatably disposed in a square jacket 50 of somewhat thicker but yet somewhat flexible material. The disk 48 has a central opening 52 through it, and the jacket 50 has openings 54 in its two thicknesses that are concentric with the opening 52. The jacket 50 also has a pair of aligned radially extending slots 56 in its two thicknesses.

The main frame 20 has an end panel 58 (see FIG. 6), and a slot 60 is provided in the panel 58 for receiving the diskette 46. The main frame 20 is provided with a pair of stops 62 and 64 (see FIG. 1) for the diskette 46; and, when the diskette 46 has been fully moved into the machine into abutment with the stops 62 and 64, the central opening 52 of the disk 48 is concentric with the spindle 24.

Figure 5:
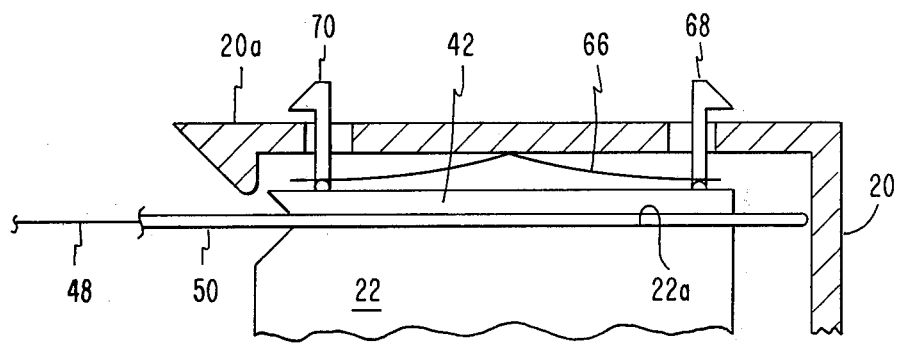
FIG. 5 is a fragmentary sectional view taken on line 5—5 of FIG. 1.

When the diskette 46 is fully positioned in the machine in contact with the stops 62 and 64, it has passed underneath the pressure plate 42 and on top of a platen portion 22a of the subframe 22 (see FIG. 5). A leaf spring 66 is disposed between the plate 42 and a portion 20a of the frame 20 that overlies the platen portion 22a, and the pressure plate 42 thus holds the diskette 46 in a proper position and plane for data transfer with respect to the magnetic heads 28 and 30. The pressure plate 42 is provided with a pair of barbed projections 68 and 70 extending through corresponding openings in the frame portion 20a, and the pressure plate 42 is thus held in a position over the platen portion 22a.

The motor 44 is disposed beneath and is carried by the main frame 20 and has an output pulley 72 (see FIG. 1) extending upwardly in the plane of the spindle 24. A belt 74 extends around the pulley 72 and spindle 24 for the purpose of driving the spindle 24 from the motor 44.

Figure 2:
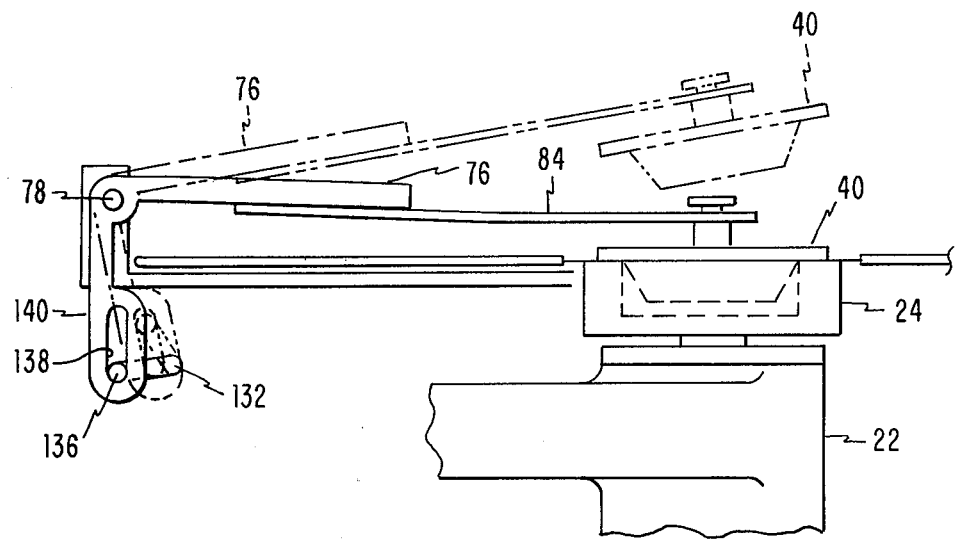
FIG. 2 is a fragmentary sectional view taken on line 2—2 of FIG. 1.

The collet 40 is swingably mounted on the frame 20 by means of a swing arm 76. The arm 76 is swingably and articulately mounted on the frame 20 by means of a pin 78 extending through the arm 76 and a pair of upstanding lug portions 80 and 82 of the frame 20. The swing arm 76 terminates with leaf spring 84, and the collet 24 is carried by the spring 84 by means of a stud 86. The collet 40 may be of any suitable construction, and the connection of the stud 86 with the spring 84 may be conventional, with a lost motion existing between the spring 84 and the collet 40 particularly with a spacing being provided between the head of the stud 86 and the spring 84 when the collet 40 is in its fully engaged position with respect to the spindle 24 as shown in FIG. 2.

Figure 1:
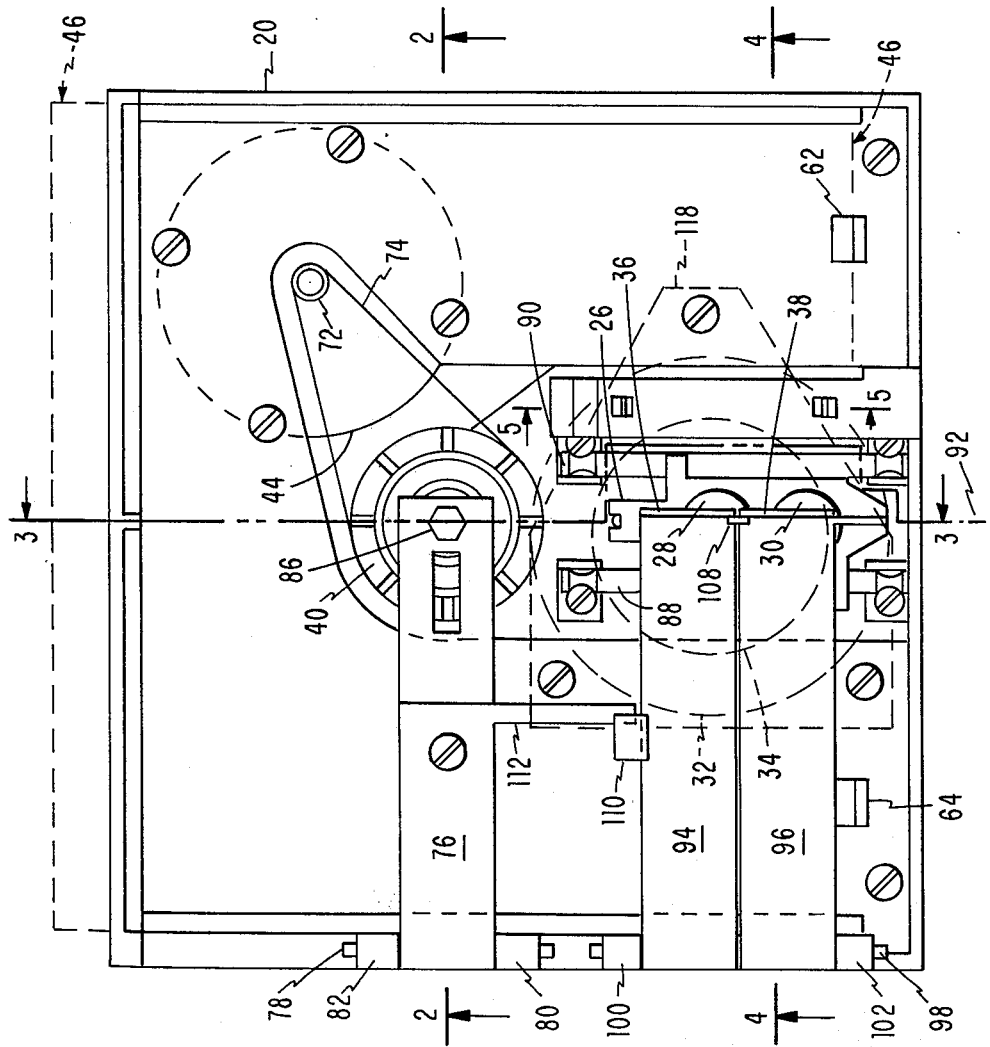
FIG. 1 is a top plan view of a disk drive machine incorporating the principles of the invention and including a drive cam plate rotatably supported on a support plate and having a spiral groove in which a follower is disposed for moving a magnetic head carriage radially of the disk used by the machine.

The carriage 26 is reciprocatively disposed on the subframe 22 by means of a pair of guide rods 88 and 90 which are fixed with respect to the subframe 22 and which extend through the carriage 26 (see FIGS. 1 and 3). The two magnetic heads 28 and 30 are embedded in the upper surface of the carriage 26 with their centers in line with the longitudinal center lines of the pads 36 and 38 on a center line 92 passing through the center of the spindle 24. The rods 88 and 90 extend parallel with the center line 92, and the carriage 26 and head 28 and 30 thus move radially with respect to the spindle 24 and the disk 48 that is driven by the spindle 24.

The pads 36 and 38 are respectively carried by swing arms 94 and 96. The arms 94 and 96 are swingably and articulately mounted with respect to the frame 20 by means of a pin 98 extending through the arms 94 and 96 and through upstanding lug portions 100 and 102 of the frame 20. A torsion spring 104 is effective between the frame 20 and each of the swing arms 94 and 96 and is wound about the pin 98 (see FIG. 4). The springs 104 urge the arms 94 and 96 downwardly to move the pads 36 and 38 toward the magnetic heads 28 and 30 respectively. The arms 94 and 96 are connected by portions 106 and 108 respectively on the arms 94 and 96 (see FIG. 3). The portion 106 overlies the arm 96, and the portion 108 overlies the portion 106. The arm 94 and the arm 76 are interconnected by arm portion 110 on arm 94 and arm portion 112 carried by arm 76. The arm portion 110 overlies the arm portion 112 as shown in FIG. 3.

Figure 7:
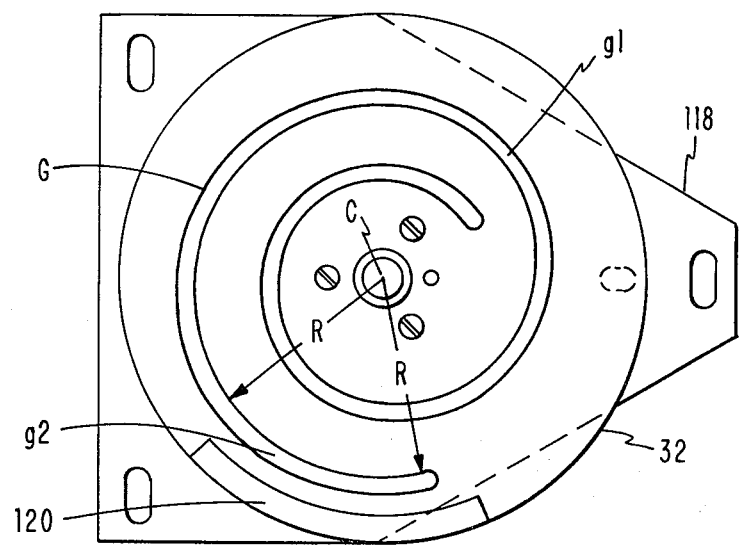
FIG. 7 is a top plan view of the cam plate and support plate.
Figure 9:
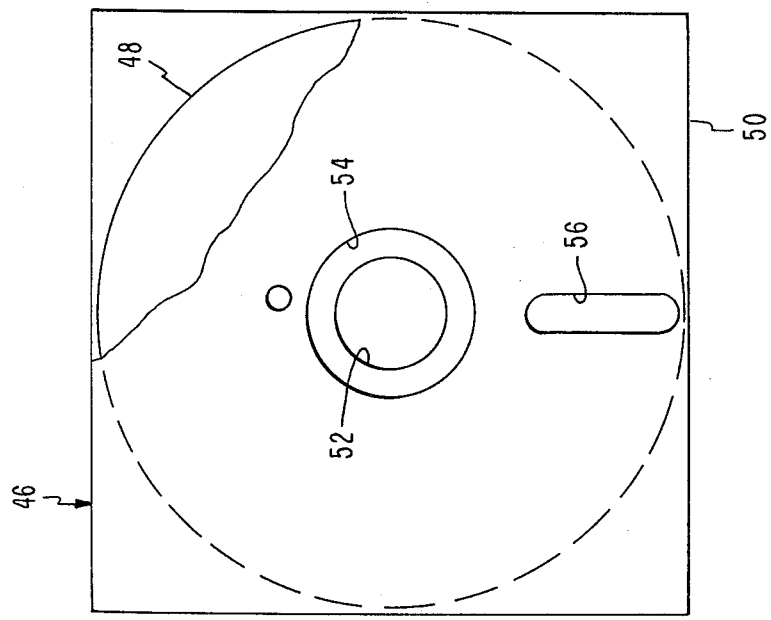
FIG. 9 is a top plan view of a magnetic diskette used by the machine.

The carriage 26 is slideably moved on the rods 88 and 90 by means of the cam plate 32. For this purpose, the cam plate 32 is provided with a groove G including a spiral groove part g1 and a final groove sector g2 which is of constant radius about the center C of the cam plate 32 and exists between the equal length radii R shown in FIG. 7. A follower ball 114 is held in the groove G by means of a leaf spring 116 depending from the carriage 26 and pressing on the ball 114 (see FIG. 3). The motor 34, which is preferably of the electrical stepping type, is drivingly connected with the cam plate 32 to thus drive the carriage 26 and heads 28 and 30 when the ball travels in the spiral groove part g1. The motor 34 is mounted on a support plate 118 which in turn is fixed to the subframe 22.

The cam 32 is effective at times for moving the swing arm 96, and for this purpose the cam 32 is provided with an upwardly extending ramp portion 120 on the periphery of the cam 32 (see FIG. 3). A pin 122 extends through and is slideably disposed in the carriage 26, and the pin 122 is adapted to be acted on by the ramp portion 120 when the carriage 26 is at a limit of its movement as will hereinafter be described in greater detail. A return spring 124 is provided between the lower head of the pin 122 and the carriage 26. The swing arm 96 is provided with a downwardly depending portion 126 that is aligned with the pin 122 when the carriage 26 is at this limit of its movement.

Figure 6:
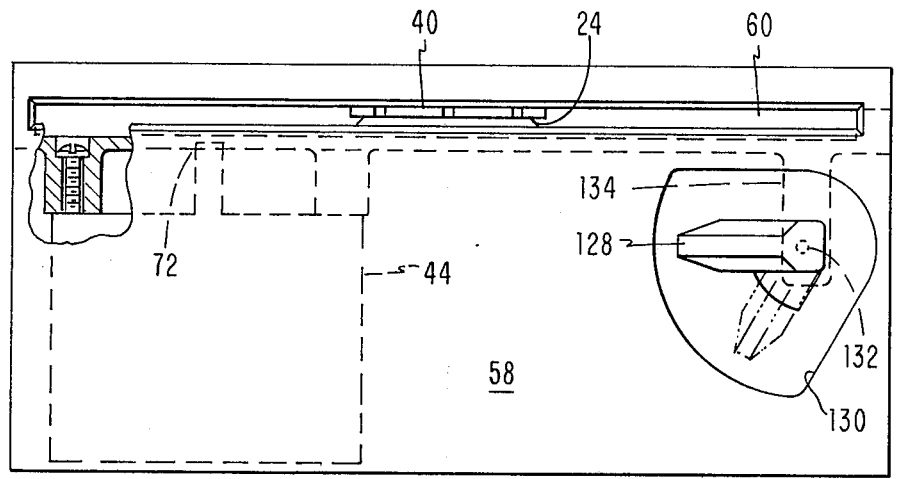
FIG. 6 is an end view of the machine.

The swing arm 76 and collet 40 are swung under the action of a manually operated lever 128 disposed in a recess 130 in the panel 58 (see FIG. 6). The lever 128 is fixed on a shaft 132 which is rotatably disposed in the panel 58 and in a downwardly depending lug portion 134 of the frame 20. The shaft 132 has an offset portion 136 (see FIG. 2), and the portion 136 is disposed in a slot 138 of a downwardly depending part 140 of the swing arm 76.

In the operation of the machine, the lever 128 may be assumed initially to be in its dotted line position shown in FIG. 6. In this position, the offset part 136 of the shaft 132 is in its dotted line position shown in FIG. 2 and is at the upper end of the slot 138. The offset shaft portion 136 acting against a side of the slot 138 holds the arm 76 in its upwardly extending dotted line position shown in FIG. 2, and the collet 40 likewise is in its FIG. 2 dotted line position separated from the spindle 24.

In the raised position of the arm 76, its portion 112 underlying the arm portion 110 acts against the latter and holds the arm 94 in a raised position against the action of its spring 104 so that the pad 36 is separated from the magnetic head 28. The arm portion 106 underlying the arm portion 108 acts against the latter and in a similar manner holds the arm 96 in a raised position against the action of its spring 104 to hold the pad 38 spaced from the magnetic head 30. Therefore, with the lever 128 being in its dotted line position shown in FIG. 6, the collet 40 is raised with respect to the spindle 24, and the pads 36 and 38 are raised with respect to the magnetic heads 28 and 30; therefore, the diskette 46 may be freely inserted into the machine.

In order to move the diskette 46 into operating position in the machine, it is moved into and through the slot 60 (see FIG. 6) with the diskette slots 56 foremost. This diskette movement is continued until the diskette 46 bottoms on the stops 62 and 64, and the diskette 46 is then in its operating position in the machine. The disk opening 52 is then in axial alignment with the spindle 24, and the slots 56 are in alignment with the heads 28 and 30 and with the pads 36 and 38 (on the center line 92). The trailing end of the diskette 46 is then in its dotted line position shown in FIG. 1, protruding out of the machine and out of the slot 60.

The lever 128 is then swung into its full line position shown in FIG. 6, and this has the effect of moving the collet 40 into engagement with the spindle 24 to grip the disk 48 between the collet and spindle and of moving the pads 36 and 38 downwardly to hold the disk 48 in firm contact with the magnetic heads 28 and 30. This movement of the lever 128 to its full line position rotates the shaft 132 correspondingly and moves the offset part 136 of the shaft 132 into its full line position of FIG. 2.

The offset shaft part 136 thus travels down the slot 138 in the part 140 of the arm 76 and at the same time swings the arm 76 in the clockwise direction as seen in FIG. 2 about the pin 78. The arm 76 thus moves the collet 40 into its full line position shown in FIG. 2 in engagement with the spindle 24 except for the presence of the disk 48 between the collet and spindle, and the leaf spring 84 bends as the collet 40 so engages the spindle 24. The resilient action of the spring 84 thus holds the collet 40 firmly in engagement with the spindle 24, clamping the disk 48 between the collet 40 and spindle 24.

The downward movement of the arm portion 112 of the arm 76 allows the spring 104 effective on the arm 94 to swing the arm 94 downwardly, since the arm portions 112 and 110 no longer hold the arm 94 in a raised position; and the pad 36 therefore applies force on the disk 48 and holds it firmly in contact with the magnetic head 28. The arm 96 swings downwardly substantially at the same time under the action of its spring 104, since the arm portion 108 of the arm 96 is no longer supported by the arm portion 106 on arm 94. The pad 38 fixed on the arm 96 then applies force onto the disk 48, firmly holding the disk in contact with the magnetic head 30. The diskette 46 is then in operating position and disposition in the disk file machine ready for a transfer of data to or from the disk 48 using the heads 28 and 30.

The motor 44 is effective through the pulley 72 and belt 74 to drive the spindle 24. Since the disk 48 is clamped between the collet 40 and spindle 24, the disk 48 is driven at the same time, with the jacket 50 remaining stationary in the machine. A data transfer may then take place from or to the disk 48 using the heads 28 and 30.

The concentric tracks on the disk 48 on which the heads 28 and 30 are effective may be changed by changing the positions of the carriage 26 and heads 28 and 30 radially of the disk 48, with movement of the carriage 26 along the rods 88 and 90. The motor 34 and cam plate 32 are effective for this purpose; and, as the motor 34 drives the cam plate 32, the ball 114 travels in the groove G and particularly in the spiral groove part g1 of the cam plate 32. The spring 116 effectively connects the ball 114 with the carriage 26 and moves the carriage 26 and thereby the heads 28 and 30 on centerline 92 toward or away from the centers of the disk 48, spindle 24 and collet 40 that are in alignment. Either side edge of the groove g1 may be considered as a spiral edge controlling movement of the carriage 26. Since there are two of the heads 28 and 30, it is apparent that each of the heads need only register with one-half of the usable concentric tracks on the disk 48 for data transfer with respect to all of the tracks on the disk. During all of the data transfer operations, the two pads 36 and 38 bear on the face of the disk opposite that on which the heads 28 and 30 bear and are of such lengths to support the disk for the complete movements of the heads, being opposite the heads for their complete movements. The pads 36 and 38 are thus as long as the traverse of the heads 28 and 30 radially of the disk and of course have no movement in this direction. The pads 36 and 38 thus maintain the disk 48 in firm data transferring relationship with the heads 28 and 30 in contact or near contact with the disk depending on disk speed.

Figure 8:
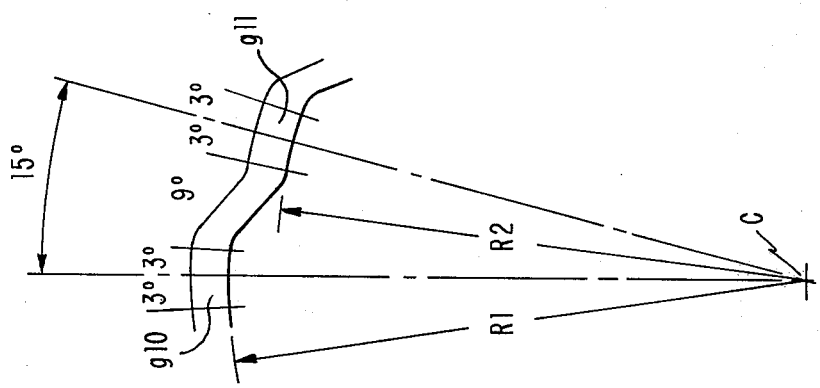
FIG. 8 is a fragmentary plan view of a modified, stepped spiral groove in the drive cam plate.

In order that the motor 34 need not be so very accurately controlled while yet accurately locating the heads 28 and 30 on selected concentric magnetic tracks on disk 48, it may be desirable for this purpose to provide circular land portions g10, g11, etc. in the groove part g1, with the groove part g1 nevertheless remaining generally spiral. This is shown in FIG. 8, and it will be observed that the land portions g10 and g11 respectively are on the radii R1 and R2 about center C. When the ball 114 is in any of these land portions g10, g11, etc. the cam 32 may have a slight rotative movement, such as of 6°, while the heads 28 and 30 remain accurately located on certain ones of the concentric tracks on the disk 48.

When it is desired to render the disk drive machine inoperative, without removing the diskette 46 from the machine, the carriage 26 is moved by means of cam plate 32 to a position in which the head 30 is effective on the outermost concentric track of the disk 48. At this time, it is desirable to raise the pads 36 and 38 with respect to the heads 28 and 30 to reduce wear on the disk 48. The ramp portion 120 of the cam plate 32 and the pin 122 are effective for this purpose. As the motor 34 rotates the cam plate 32 to this limit of movement of the cam plate 32, the ramp portion 120 moves beneath the pin 122 and raises the pin 122 against the action of the spring 124. The pin 122 contacts the depending portion 126 of the arm 96 and moves the arm 96 upwardly so as to disengage the pad 38 with respect to the disk 48. The arm 94 is raised substantially at the same time to deactivate the pad 36 due to the action of the arm 96 on the arm portion 106 that overlies the arm 96. As the arm 96 swings upwardly, it contacts the arm portion 106 and raises the arm 94 upwardly. As the ramp portion 120 travels beneath the pin 122 and raises the pin, the ball 144 travels in the constant radius section g2 of the groove G; and the carriage 26 and heads 28 and 30 during this time thus have no radial movement on the centerline 92. At this time, the heads 28 and 30 are inoperative to transfer data with respect to disk 48.

When the desired data transfer has been completed and it is desired to remove the diskette 46 from the machine, with the heads 28 and 30 being in alignment with any of the magnetic tracks on the disk 48 that they traverse, the lever 128 is swung into its dotted line position shown in FIG. 6. This has the effect of moving the offset part 136 of the shaft 132 toward the upper end of the slot 138 and at the same time rotating the arm 76 in a counterclockwise direction as the arm is shown in FIG. 2 so as to move the arm 76 into its dotted line position shown in this figure. The spring 84 swings with the arm 76 and moves the collet 40 out of engagement with the spindle 24 and releases the disk 48. The arm portion 112 of arm 76 in its movement upwardly acts on the arm portion 110 of arm 94, swinging the arm 94 upwardly against the action of its spring 104; and the arm portion 106 of arm 94 in its upward movement acts on the arm portion 108 and swings the arm 96 upwardly against the action of its spring 104. The pads 36 and 38 are thus moved out of engagement with the disk 48 substantially at the same time as the collet 40 is raised so as to completely free the disk 48 and diskette 46. The trailing end of the diskette 46 lies beyond the panel 58 as shown in FIG. 1, and this end of the diskette may be grasped by hand so as to move the diskette 46 out of the machine.

Advantageously, the disk drive machine has the two magnetic heads 28 and 30, and fast and improved performance is thereby obtained since, if desired, both of the heads may be used at the same time for accessing two different tracks on the disk at once. Since each of the heads 28 and 30 must travel over only one-half of the working radius of the disk, the relatively small diameter cam plate 32 may be utilized for giving the heads 28 and 30 all of the radial movement on the disk 48 that is necessary. Since the cam plate 32 is relatively small in diameter, it has a relatively small inertia; and the electrical stepping motor 34 may thus be correspondingly small and low cost. Since the pads 36 and 38 are in effect carried by the main frame 20 and do not travel with the carriage 26, a corresponding caliper arrangement for the opposite head and pad is not needed; and a saving in space is obtained. It will be noticed from FIG. 1 in particular that the machine is only slightly larger in size than the diskette 46 (which for example may be about 200 mm. square), and this is particularly due to the fact that the pads 36 and 38 are stationary along axis 92 and are in effect fixed in this respect to the main frame 22 rather than being carried along with the movable transducers 28 and 30.

It is desirable that the pads 36 and 38 be raised along with the collet 40; and therefore the relatively simple mechanical interconnections between the arms 76, 94 and 96 and including the arm portions 112, 110, 108 and 106, are provided. Advantageously also, the pads 36 and 38 are raised by virtue of the ramp portion 120 effective on the pin 122 when the carriage 26 is moved to an end position. No separate electrical motor or the like is thus necessary for raising the pads under these conditions.

Having thus described our invention, what we claim as new, and desire to secure by Letters Patent is:

1. A drive machine for a magnetic disk including:
   a machine frame,
   means carried by said frame for gripping the disk at its center and rotatably driving the disk and including a rotatable disk drive spindle carried by said frame,
   a carriage carrying a pair of transducers adapted to be in data transfer position with respect to one face of the disk,
   means movably mounting said carriage with respect to said frame so that the transducers move across the disk toward and away from an outer edge thereof with each of the two transducers traversing about one-half of the radial dimension of the usable data recording space on the disk,
   a pair of pads,
   a pair of swing arms swingably mounted on said frame for holding said pads respectively in engagement with the other face of the disk each aligned opposite one of said two transducers,
   a face cam having a spiral edge traversing a distance equal to substantially one-half of said radial dimension,
   a follower connecting said spiral edge and said carriage whereby each of said heads move across substantially one-half of said radial dimension, and
   a cam portion on said face cam and interconnections between said cam portion and said two swing arms so that, when said face cam is rotatably moved to bring said two transducers to limits of their movements, said cam portion and said interconnections coact with said swing arms to swing the arms and move said pads out of engagement with the disk.

2. A drive machine for a flexible magnetic disk including:
   a machine frame,
   means carried by said frame for gripping the disk at its center and rotatably driving the disk and including a rotatable disk drive spindle carried by said frame,
   a transducer,
   transducer mounting means for movably mounting said transducer with respect to said frame so that the transducer is in data transfer position with respect to one face of the disk and moves across the disk toward and away from an outer edge thereof,
   a pad, and
   pad mounting means for pivotably mounting said pad with respect to said frame so that the pad is in contact with the other face of said disk in confronting, aligned relation to said transducer and is stationary in the direction of transducer movement across the disk,
   said pad having such an elongate dimension in the direction of transducer movement so that it is opposite to said transducer during said movement of the transducer across the disk and supports the disk during this transducer movement,
   a cam presenting first and second camming surfaces,
   a first cam follower means connected to said transducer mounting means and engaging with said first camming surface for driving said transducer across said disk as said cam is rotated,
   second cam follower means connected to said pad mounting means and engaging said second camming surface for pivoting said pad away from said disk when said transducer reaches the limits of its movement, and
   a motor for rotating said cam.

3. A machine as set forth in claim 2 wherein said first camming surface has a dwell portion during which said transducer is substantially stationary and an active portion during which said transducer is moved during rotation,
   said second camming surface has an active portion and a dwell portion, and
   said second camming surface active portion engages said second camming surface during a portion of cam rotation when said first cam follower means engages said first camming surface dwell portion.

4. A machine as set forth in claim 3 wherein said cam is a rotary member presenting a radial surface, said first camming surface is a substantially spiral groove in said radial surface and said second camming surface is a face cam element with an axially advancing inclined active surface portion.

* * * * *